United States Patent
Suzuki et al.

[11] Patent Number: 5,828,563
[45] Date of Patent: Oct. 27, 1998

[54] SINGLE PHASE INPUT HYBRID RECTIFICATION METHOD EMPLOYING AUXILIARY RECTIFICATION

[75] Inventors: Yasunobu Suzuki, Tokyo; Toru Teshima, Yokohama, both of Japan

[73] Assignee: I-Hits Laboratory, Yokohama, Japan

[21] Appl. No.: 548,423

[22] Filed: Oct. 26, 1995

[30] Foreign Application Priority Data

Dec. 29, 1994 [JP] Japan .................................... 6-341196

[51] Int. Cl.$^6$ ....................................................... G05F 3/16
[52] U.S. Cl. .............................................................. 363/126
[58] Field of Search ................................. 363/44–48, 53, 363/81, 84, 89, 126, 49; 361/91, 111; 323/207, 222, 229, 233

[56] References Cited

PUBLICATIONS

Suzuki et al., "An approach to the powerfactor compensated and efficiency improved rectification", Intelec95, Oct. 31, 1995, pp. 436–443.

*Primary Examiner*—Aditya Krishnan
*Attorney, Agent, or Firm*—Wenderoth, Lind & Ponack

[57] ABSTRACT

A single phase AC input voltage is subjected to a single-phase full-bridge rectifier to obtain a first rectified voltage. The first rectified voltage has a fundamental DC component and a harmonic component, the harmonic component being defined by a ripple voltage of the first rectified voltage. The first rectified voltage is then subjected to an auxiliary rectification in which the ripple voltage of the first rectified voltage is rectified. A resultant auxiliary DC component is added to the fundamental DC component to obtain a DC component of a rectified output voltage.

4 Claims, 13 Drawing Sheets

| | Circuits | Cost | Effici-ency | Power factor | Harmo-nics |
|---|---|---|---|---|---|
| (1) Choke input type | [circuit diagram] | ◎ | ○ | × | △ |
| (2) One converter type | [circuit diagram] | ○ | △ | ○ | △ |
| (3) Active filter type | [circuit diagram] | × | △ | ◎ | ○ |

◎ Excellent  ○ Good  △ Normal  × No good

| Circuits | DC output / AC input | Circuits | DC output / AC input |
|---|---|---|---|
| (1)  input AC100ᵛ, 0.62ᴬ / output DC94ᵛ, 0.47ᴬ | 0.71 | (2)  input AC100ᵛ, 1.1ᴬ / output DC100ᵛ, 1ᴬ | 0.91 |
| (3)  AC100ᵛ, 0.95ᴬ / DC95ᵛ, 0.95ᴬ | 0.95 | (4)  AC100ᵛ, 0.84ᴬ / DC119ᵛ, 0.595ᴬ | 0.81 |
| (5)  AC100ᵛ, 0.87ᴬ / DC120ᵛ, 0.6ᴬ | 0.827 (0.86)* *:With C' | (6)  AC100ᵛ, 0.89ᴬ / DC116ᵛ, 0.58ᴬ | 0.756 |
| (7)  AC100ᵛ, 0.91ᴬ / DC117ᵛ, 0.585ᴬ | 0.75 | (8)  AC100ᵛ, 0.84ᴬ / DC117ᵛ, 0.585ᴬ | 0.81 (0.88)* *:With C' |

SINGLE PHASE INPUT HYBRID RECTIFICATION METHOD EMPLOYING AUXILIARY RECTIFICATION

FIELD OF THE INVENTION

This invention relates to a single phase input hybrid rectification method having power saving characteristics for DC or AC output equipment, such as video and audio devices, communication equipment, computers, office automation machines such as copy machines, air conditioners, cooking machines, lighting devices, industrial motor controllers and uninterruptible power supplies.

PRIOR ART

Until today, switching power supply is popularly used for videos, audios, electronic equipments like computers, air conditioners, cooking machines, lighting apparatus, industrial motor controllers, or AC output devices like uninterruptible power supply units. And the demand for switching power supply is rapidly increasing because of improved switching semiconductors, proprietary control LSI or improvement of HF characteristics of capacitor and magnetic materials. However, recently it is pointed out that harmonic current occurred by switching power supply causes electromagnetic interferrence to commercial power line.

It is also pointed out that low power factor occurred by switching power supply causes loss of global basis energy resources. These problems are now drawing the attention of advanced countries as a common problem.

Nowadays, IEC (International Electrotechnical Commission) decided to regulate harmonic current occurred by switching power supply and low power factor, and the guide lines by Japanese Government are also required.

For example, concerning Regulation No. IEC1000-3-2 of IEC Regulations, the object of regulations is divided into 4 classes, Class A for 3 phase input equipments, Class B for motor tools, Class C for lighting apparatus and Class D for equipments having specialized which has peak power not exceeding 600 watt. Therefore, Electronic equipments except a kind of air conditioners and almost all DC output equipments are involved in Class D.

The especially important regulation of these regulations on harmonic current is on single phase capacitor input type rectifier circuit, generally used for switching power supply.

Figure 1:
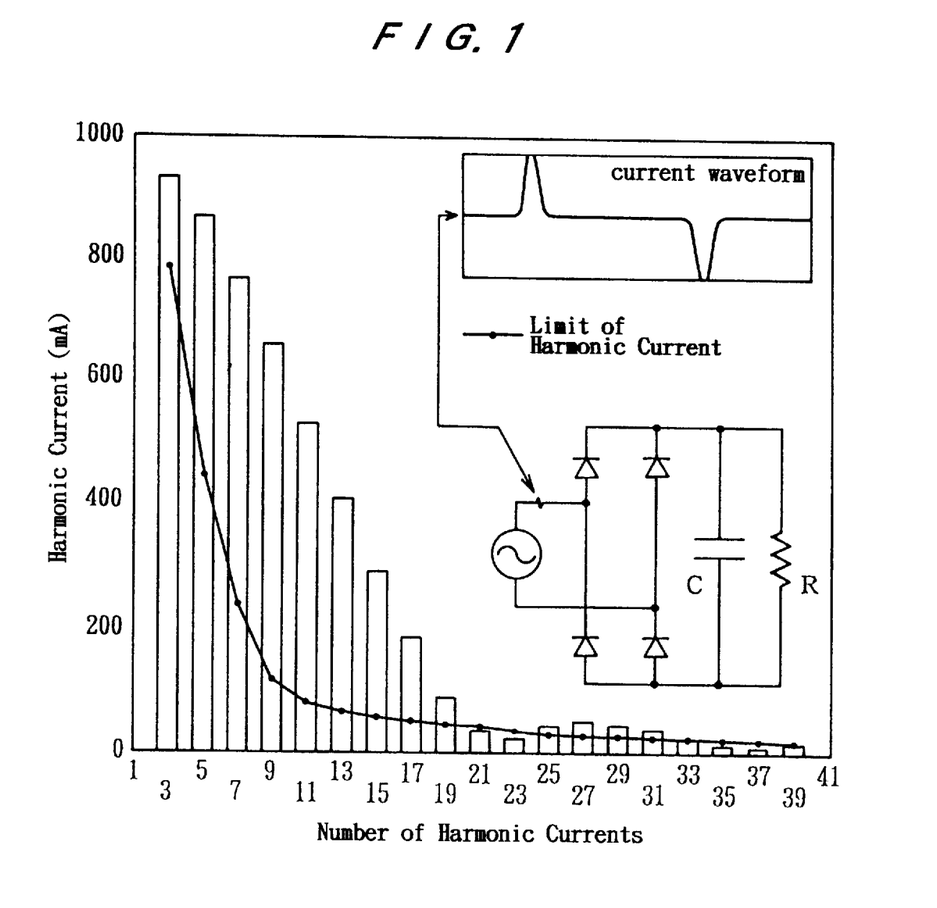
FIG. 1 shows a relation chart illustrating the relation between number and value of harmonic current in the conventional circuit.

For example, FIG. 1 shows that concerning a single phase capacitor input type rectifier circuit used for TV (230V, 230W) for European market, harmonic current value of all odd order harmonics from third harmonic to 19th harmonic largely exceeds IEC Standard which is shown with a solid line. Products with such switching power supply are likely to be unable to be sold in future.

Until now, several circuits have been suggested as guidelines against the regulations on harmonic current. Among them, an input choke coil circuit, one transistor converter method (input capacitorless method), and active filter method are generally used.

Figure 2:
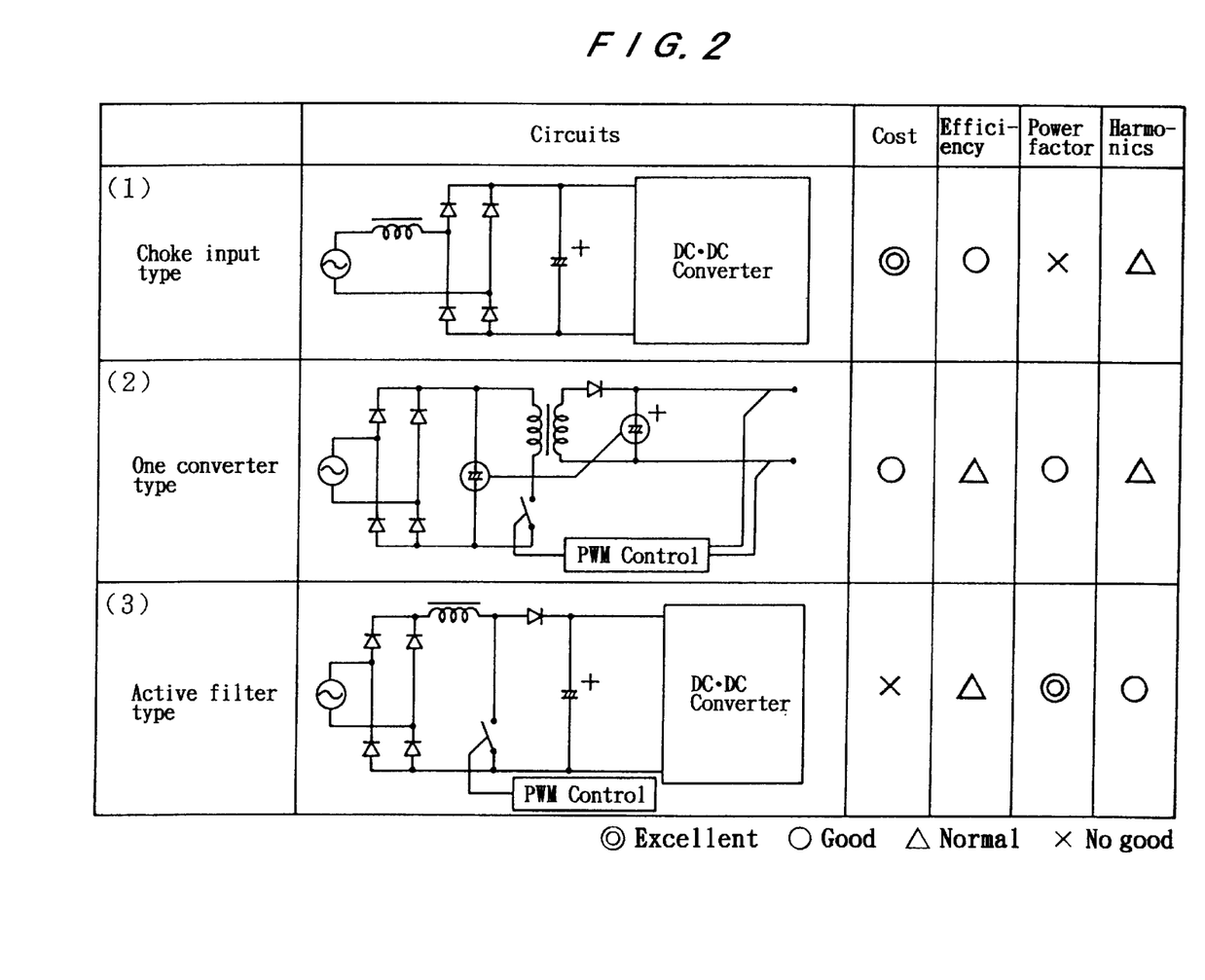
FIG. 2 shows a circuit configuration illustrating the conventional method.

An input choke coil circuit has a circuit configuration as shown in FIG. 2 (1) for example, and a choke coil is inserted from AC input side. This configuration slightly meets the above-mentioned IEC Standard.

Figure 3:
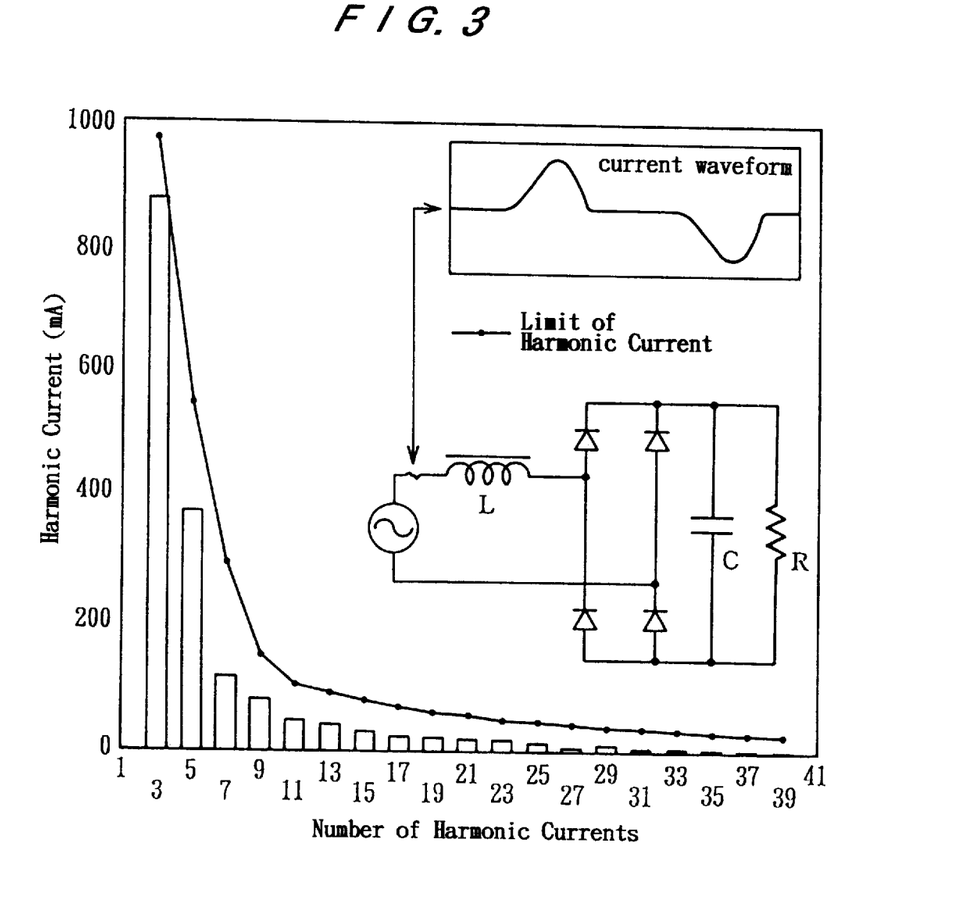
FIG. 3 shows an another relation chart illustrating the relation between number and value of harmonic current in the conventional method.

For example, when a choke coil is inserted into the input side of a single phase capacitor input type rectifier circuit used for TV (230V, 230W) for Europe as shown in FIG. 3, harmonic current values of all odd order harmonics from third harmonic to 19th harmonic are lower than IEC Standard which is shown with a solid line.

Figure 4:
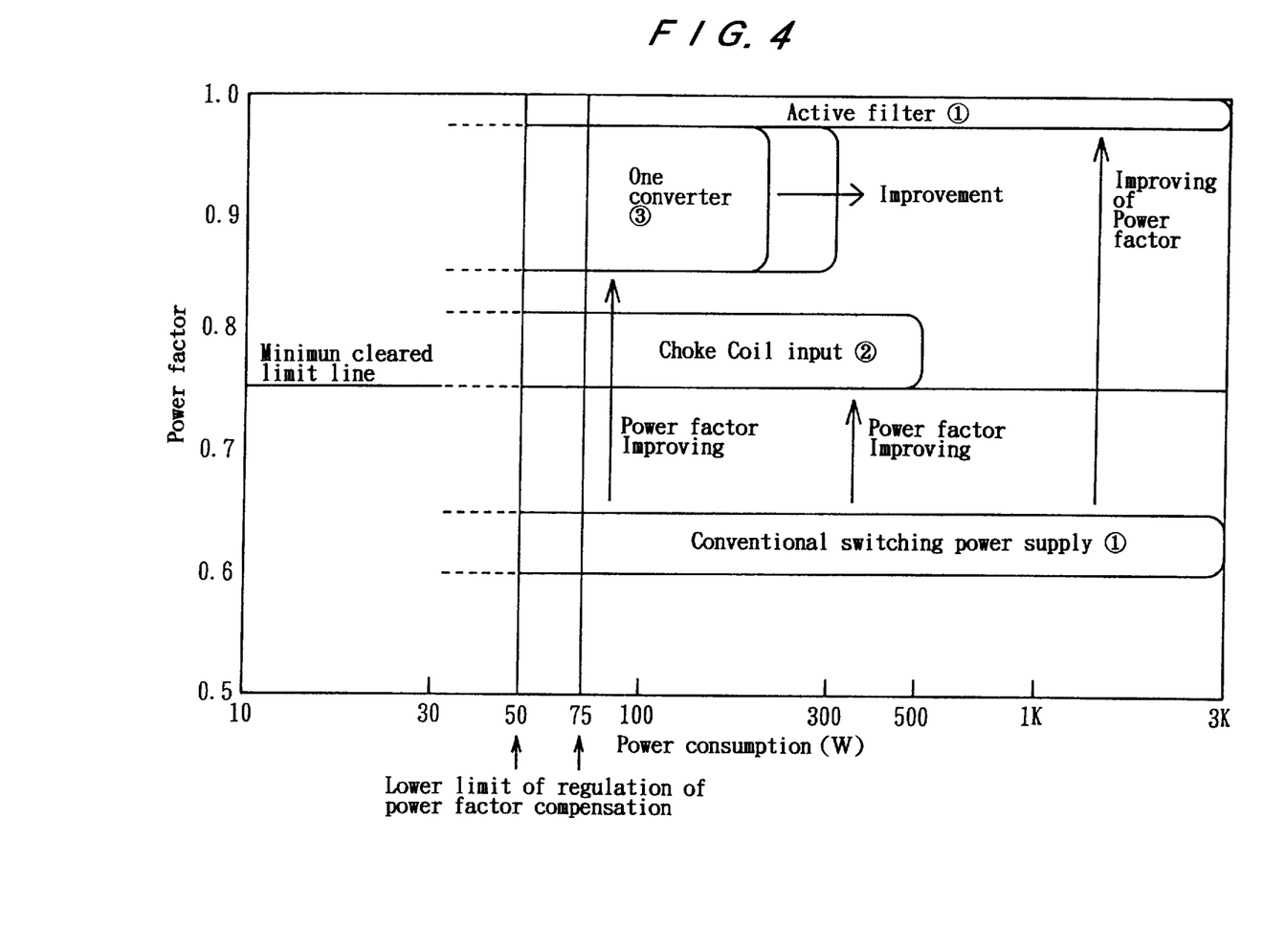
FIG. 4 shows a relation chart illustrating the relation between electric power consumption and power factor based on the conventional method.

However, power factor of an input choke coil circuit is generally 0.75~0.8 as shown in FIG. 4, for example, which meets the lowest value, 0.75, of IEC Standard, but it is not enough. Still there are lots of apparent power.

It is clear that the occurrence of harmonic current in an input choke coil circuit is caused by charging current of a capacitor directly connected with full bridge rectifier output. Accordingly, pulse width modulation (PWM) switching technology without a large capacitor has been tried.

The type of circuit for pulse width modulation is divided into one transistor converter method or active filter method.

One transistor converter method has a circuit configuration as shown in FIG. 2 (2) for example. Though it has some advantages as to cost, conversion efficiency, power factor, or powerline harmonic, but also has a weak point that it is unable to produce output power when AC input voltage instantaneous value is at around 0. Consequently, it is available only for apparatus not exceeding approx. 300 W.

Moreover, one transistor converter method has a great weak point that noise at high-speed switching leaks to AC power supply side because of lack of a large capacitor at power supply side. Accordingly, switching power supply using one transistor converter method is considerably limited to use.

On the other hand, active filter method has a circuit configuration shown in FIG. 2 (3). In this method, though power factor comes to nearly 1, it has a weak point that another DC—DC converter is necessary in addition to a power factor improved switching circuit and lower efficiency is unavoidable on the whole because output voltage is difficult to be produced when AC input voltage is at around 0 and ripple (AC component) is occurred in output power.

As stated above, guidelines against harmonic current limitation and improvement in power factor of the conventional switching power supply accompany negative factors such as increase of cost, decrease of conversion efficiency or increase of size and weight.

SUMMARY OF THE INVENTION

This invention was given under the circumstances and aims to provide several single phase input hybrid rectification methods with limitation free of power capacity range to overcome the conventional technical problems and improve radically conversion efficiency, power factor and powerline harmonics.

To solve the above problems, this invention provides Single phase input fundamental and harmonic component hybrid rectification method having the characteristics that higher efficiency than a conventional single phase full bridge rectifier circuit can be obtained by putting the ripple power (harmonic component) rectifier and the auxiliary rectified DC component adds on the fundamental DC component.

And, this invention provides Single phase input hybrid rectification method (Claim No. 2) having characteristics that higher efficiency than a conventional LC filter type rectifier circuit can be obtained by putting the ripple voltage (harmonic component)rectifier and the auxiliary rectified DC component adds on the fundamental wave DC component.

Moreover, this invention provides a Single phase input hybrid rectification method having characteristics that higher efficiency than a single phase full bridge rectifier circuit or 2 phase half bridge rectifier circuit can be obtained by inserting LC filter composed of a choke coil with the step up secondary coil and a smoothing capacitor and by putting the ripple voltage (AC voltage)rectifier circuit connected with the secondary coil and the auxiliary rectified DC component adds on the fundamental wave DC component.

BRIEF DESCRIPTION OF THE INVENTION

DETAILED DESCRIPTION OF THE INVENTION

Figure 5:
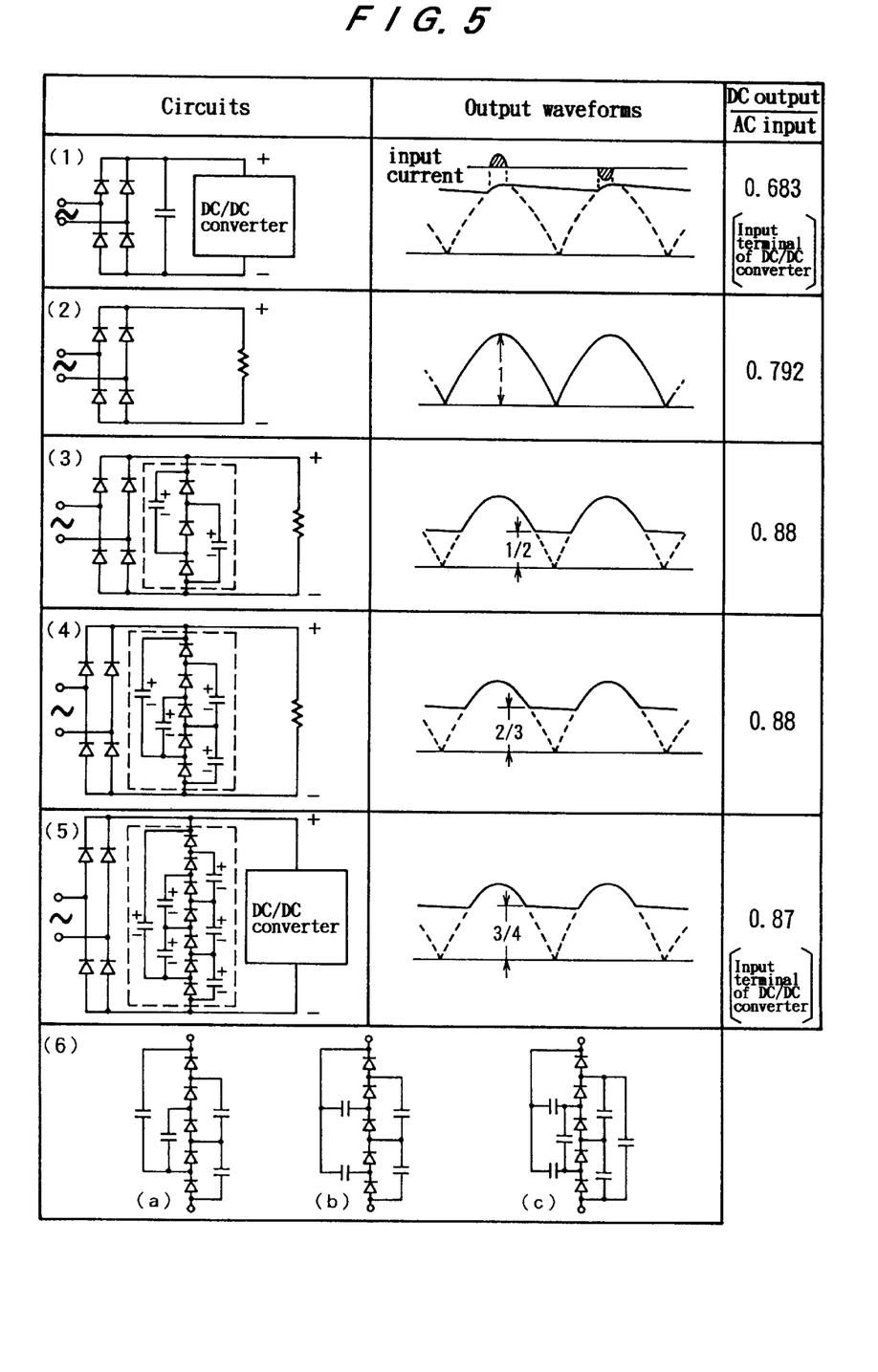
FIG. 5 shows a circuit configuration illustrating an actural example of this invention and explanation of the output voltage waveforms.

FIG. 5 shows an example of a circuit configuration of this invention compared with the conventional method to solve the above problems.

This invention is able to realize higher rectifier efficiency than the conventional methods, and makes power saving of several DC or AC output equipments possible by using the above single phase input hybrid rectification method.

The concrete method and its active effects are shown below as actual examples.

FIG. 5 shows an example of a circuit configuration of this application to solve the above problems as compared with the conventional method.

FIG. 5 (1) is a generaly used capacitor input type rectifier circuit, in which input power factor is lowered because smoothing is conducted only by a high capacity condenser on DC output side and charging current is concentrated to the peak values of a sine curve AC voltage within a short time as stated above.

FIG. 5 (2) is a standard single phase full bridge rectifier circuit, in which the input power factor is 1 and the efficiency is approx.79% because the voltage drop for 2 diodes is deducted from the theoretical value $8/\pi^2 = 81\%$.

The portion of FIG. 5 (3), FIG. 5 (4) and FIG. 5 (5) encircled by a dotted line is an auxiliary rectifier circuit which can produce additional DC power by combining capacitors with diodes and by smoothing the ripple power (harmonic component) which has been disregarded until now.

As the smoothing DC output power produced through an auxiliary rectifier circuit is parallel to the output of single phase full bridge main rectifier circuit as shown in FIG. 5 (3)~FIG. 5 (5), rectifed power is supplied to the DC load from an auxiliary rectifier circuit only while the absolute value of input AC voltage is lower than the output voltage value of the auxiliary rectifier circuit.

That is, the auxiliary rectifier circuits shown in FIG. 5 (3)~FIG. 5 (5) actively increase the efficiency to rectify and smooth the ripple voltage (harmonic component) just like the smoothing capacitor of FIG. 5 (1).

Therefore, it is possible to obtain a higher efficiency than the circuits of FIG. 5 (1) or FIG. 5 (2) because the rectified ripple power which is disregarded by the conventional circuits is recycled by the auxiliary rectifier circuit.

That is, this hybrid rectification method is very effective for achieving energy saving in various rectifiers.

The rate is improved by 8~9% than the standard efficiency 79% of FIG. 5 (2) due to the number of circuit element (when 79% is the standard, the rate is 10~11%). The measurement value shows that the input AC current (apparent power) of the method shown in FIG. 5 (3)~FIG. 5 (5) is reduced by 27~29% under the same DC output power compared with the conventional capacitor input type rectifier circuit shown in FIG. 5 (1). This measurement value is confirmed by the experiment which alters the same type of popular DC—DC converter for marketing in FIG. 5 (1) to the invented method shown in FIG. 5 (5).

And, by using this rectifier circuit in FIG. 5 (3) for the rectifier circuit of the above-mentioned one transistor converter method or active filter method instead of the circuit FIG. 5 (2), the ripple voltage involved in the DC output voltage and the peak value of the switching noise are substantially reduced and the output capacity range is almost limitation free. The circuits shown in FIG. 5 (6)–(a), (b), (c) are included in the auxiliary rectifier circuit.

Figure 6:
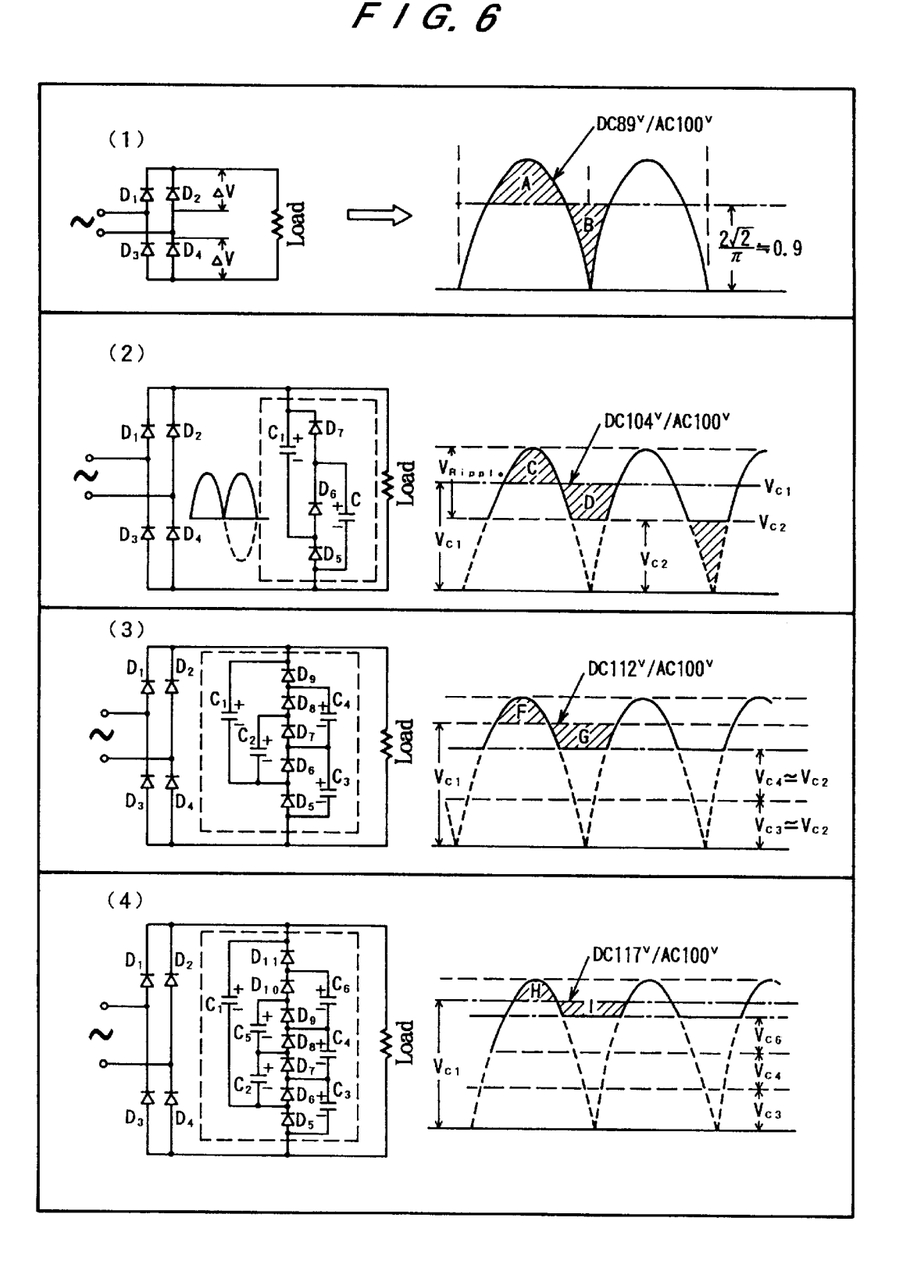
FIG. 6 shows an explanation chart of DC output voltage values and wave forms of a circuits shown in FIG. 5.

FIG. 6 shows the relation between auxiliary rectifier terminal voltage and DC output voltage under actual use for FIG. 5 (3),(4) and (5). A and B of FIG. 6 shows the ripple voltage of the conventional single phase full bridge rectifier circuit, and C & D, F & G and H & I show the ripple voltage under actual use for the method of the present invention.

Seeing from FIG. 6, it is clear that ripple is reduced by adding auxiliary rectifier circuit composed of capacitors and diodes. However, improvement in efficiency of the circuit is saturated because the efficiency is reduced by the voltage drop of the diodes, even if the number of elements is increased to more than the actual example of FIG. 6 (4). Accordingly, the circuit of FIG. 6 (4) or a circuit with another booster circuit are suitable to increase cost performance and to reduce a volume and input current (power).

And, the lowest and highest elements of the diodes for the auxiliary rectifier require the high voltage elements because input AC voltage is directly applied when AC power on. However, it is possible to reduce power loss caused by the forward voltage drop of the diodes by using a element with a low voltage, but a lower forward voltage drop like a shottkey barrier diode due to intermediate diodes are applied by divided voltage.

Figure 7:
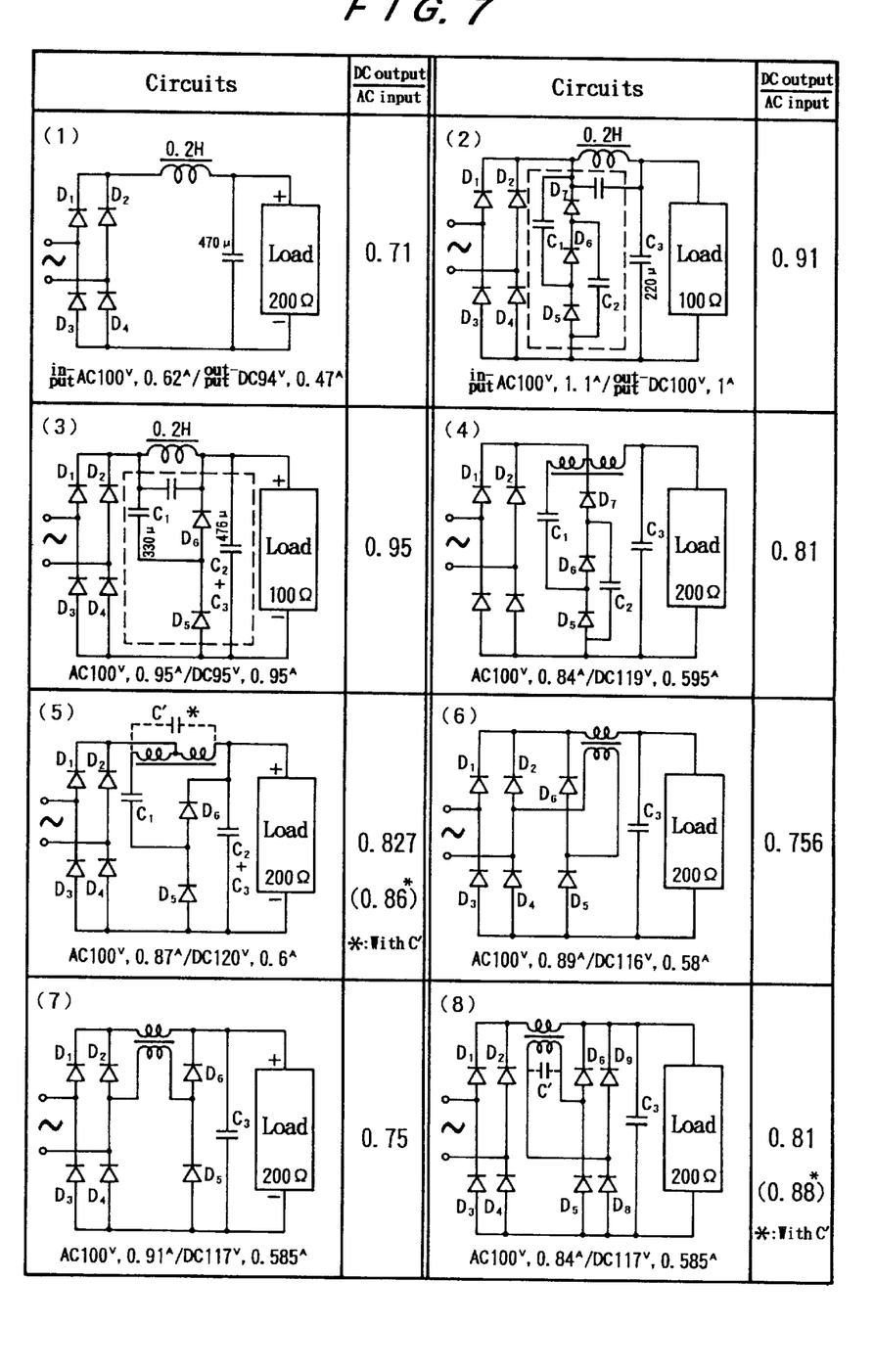
FIG. 7 shows a comparison of the basic and improved LC filter type rectifier circuit actual example of this invention.

FIG. 7 (1) shows a relatively middle or large capacity rectifier circuit with over 100 W DC output power, which adopts a conventional and popular LC filter. FIG. 7 (2)~FIG. 7 (8) show an actual example of the invented recfication method when used for the above circuit. It is quite natural that the ripple voltage involved in the DC output voltage is lower than the examples shown in FIG. 5 and FIG. 6 and it is useful for all kinds of DC power supply.

FIG. 7 (2) shows that improvement in efficiency and decrease of ripple voltage (or power) before smoothing are given by converting the ripple voltage to a DC voltage in the front stage of a choke coil through an auxiliary rectifier circuit (encircled with a dotted line) shown in FIG. 5 and FIG. 6 and by adding it to output power of a single phase full bridge main rectifier circuit composed of diodes $D_1$, $D_2$, $D_3$ and $D_4$.

Owing to this, it is possible to decrease the rated capacity of a choke coil in proportion to the decrease of ripple voltage applied to a choke coil, and it is possible to be minimized and to improve efficiency by reducing internal loss. An auxiliary rectifier circuit encircled by a dotted line in FIG. 7 (2) shows the circuit method of FIG. 6 (2) for example, which is however almost the same as the circuit method of FIG. 6 (3) or FIG. 6 (4). The suitable method should be selected depending on cost performance, size or total efficiency.

FIG. 7 (3) shows a rectifier circuit where a capacitor for smoothing filter in an auxiliary rectifier circuit and a capacitor for a LC filter of a main rectifier circuit are commonly used when the ripple (AC) power occurred on both sides of a choke coil is converted to DC power through the auxiliary circuit encircled with a dotted line, and which is small and has the fewest elements in total and maintains the best cost performance.

FIG. 7 (4) shows that ripple voltage in the front stage of a choke coil is decreased relative to that of the DC output wave of FIG. 6 (4), in spite of the small number of capacitors and diodes, by setting the secondary coil on a choke coil and stepping up the ripple voltage involved in the output power of a single phase full bridge rectifier circuit with an auto transformer function, and moreover, by being rectified through an auxiliary rectifier circuit.

Consequently, it is possible to minimize the rated capacity of a choke coil and keep the DC output ripple voltage within the specification to be available for actual use.

FIG. 7 (5) shows a method made by reducing the circuit element of FIG. 7 (4) and simplifying the circuit to increase cost performance.

FIG. 7 (6) shows a method to put the ripple voltage occurred in the secondary coil of a choke coil after full bridge rectified by $D_2$, $D_4$, $D_5$ and $D_6$ in parallel with a single phase full bridge rectified output voltage composed of $D_1$, $D_2$, $D_3$, and $D_4$, $D_2$ and $D_4$ are commonly used for main rectifier and auxiliary rectifier.

Though $D_1$~$D_6$ seem to be equivalent to a 3 phase full bridge rectifier circuit, they are not exactly equivalent to a 3 phase full bridge, because $D_1$~$D_4$ are applied with 50 Hz input voltage and $D_2$, $D_4$, $D_5$ and $D_6$ are applied with 100 Hz ripple (harmonic component) voltage which is the second harmonic.

FIG. 7 (7) and FIG. 7 (8) are the transformation. FIG. 7 (8) is a method to put auxiliary rectified output power to the DC output side, and FIG. 7 (7) is a method to supply a half of ripple power to each front and later stage of a choke coil.

As stated above, various circuit methods are adopted for this invented efficiency improved method. However, the integrated and common concept is to improve rectifier efficiency by transforming the ripple power (harmonic component), disregarded by the conventional single phase full bridge rectifier circuit, into DC power and by adding to the conventional DC output power, which is the basic concept of this invention.

And, DC output/AC input value of FIG. 5 and FIG. 7 are confirmed by experiments, and the value shows clear improvement in efficiency and power factor.

Figure 8:
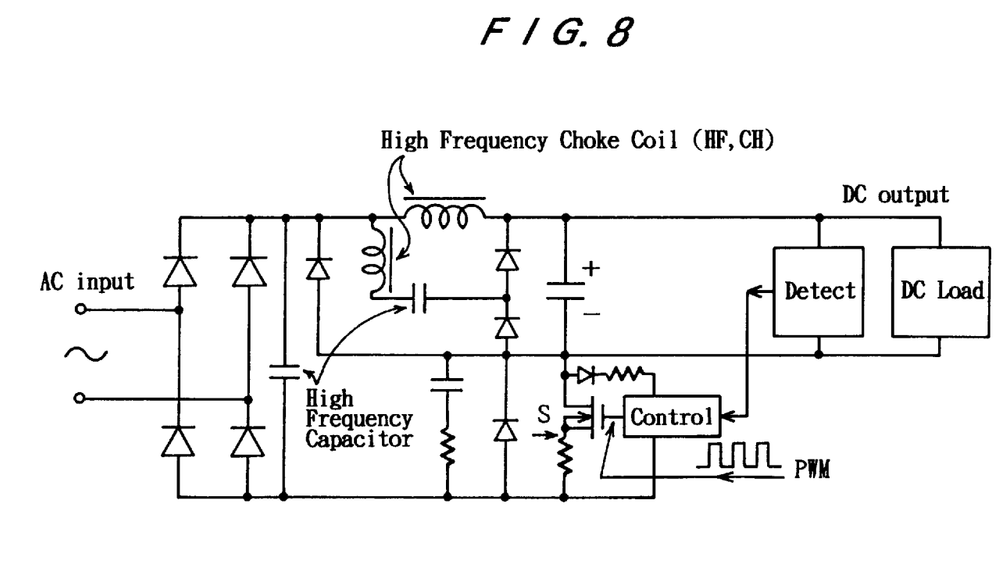
FIG. 8 shows an actual example of this invention for input-output non-insulated high frequency hybrid rectification method.
Figure 9:
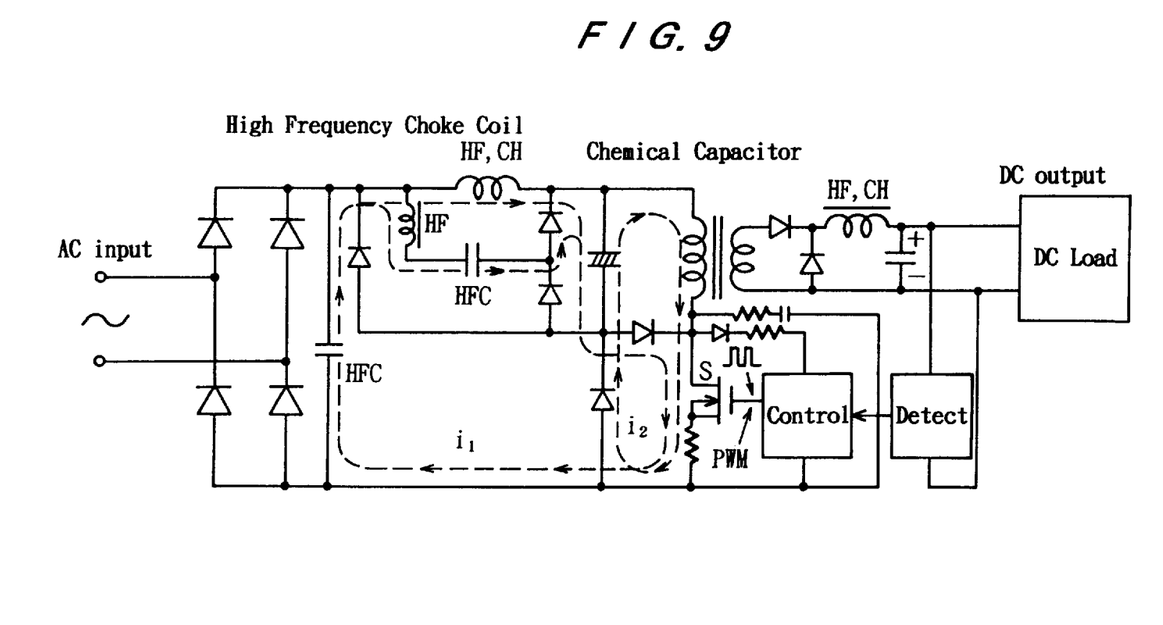
FIG. 9 shows an actual example of this invention for input-output insulated high frequency hybrid rectification method for small capacity with one transistor type.
Figure 10:
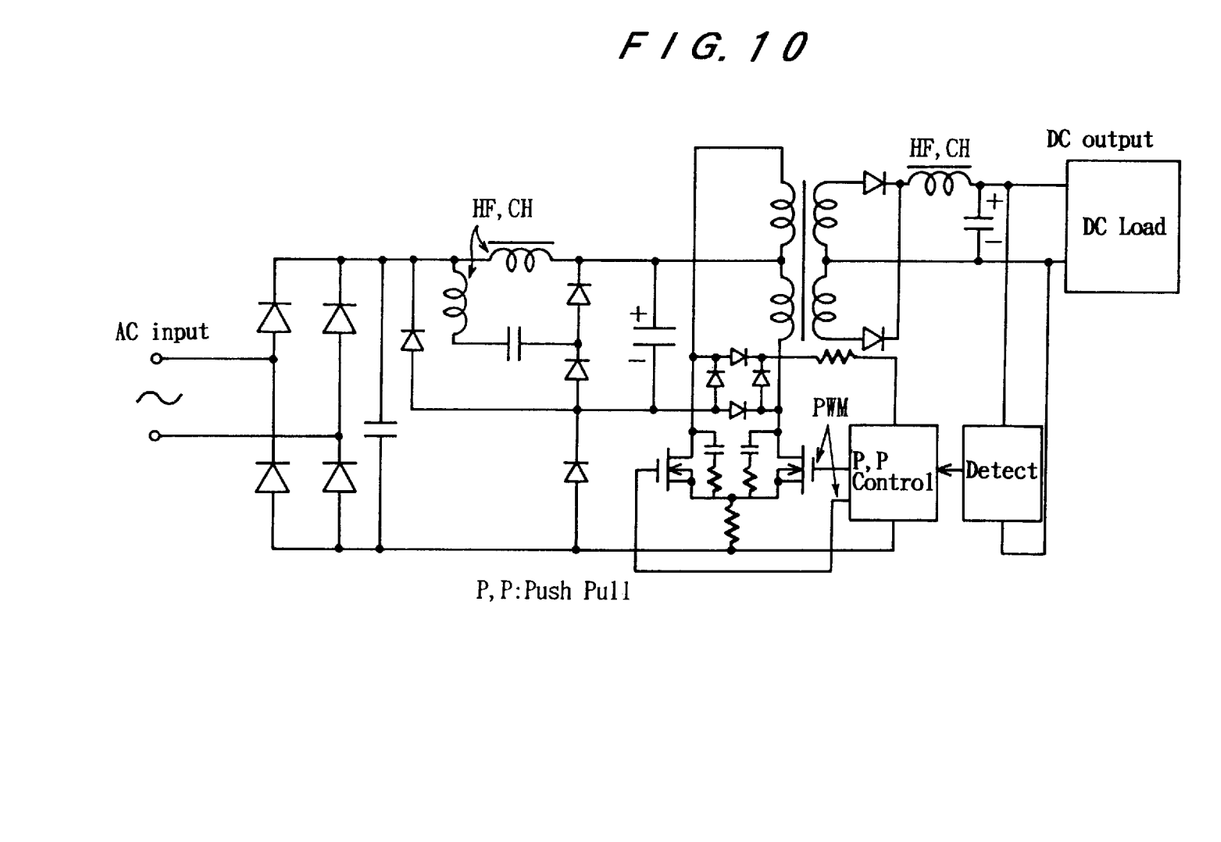
FIG. 10 shows an actual exmple of this invention as the same method as FIG. 9, but for large capacity with push pull transistor type.

FIG. 8, FIG. 9 and FIG. 10 show other actual examples. That is: FIG. 8 shows an example of input-output noninsulated high frequency hybrid rectification method, which has a characteristic to insert a semiconductor switch (S) between a single phase full bridge rectifier circuit and LC filter and give on-off control to the semiconductor switch (S) at some KHz~some 100 KHz.

This method is able to not only PWM control DC output voltage but also greatly minimize the value, capacity and weight of a choke coil (L) and a capacitor (C). Accordingly, it is possible to realize the minimization the size and weight for the overall power supply equipment.

FIG. 9 shows an example of input-output insulated high frequency hybrid rectification method DC—DC converter (for small capacity with a one transistor). That is, when the invented method is applied for a DC—DC conver with one transistor type to obtain smoothed DC output power by insulating AC input side and DC output side, high frequency current ($i_1$) to charge the high capacity electrolytic condenser on the input side of DC—DC converter and high frequency current ($i_2$) to control output power of DC—DC converter are summed up and put to the switching transistor (S).

As $i_1$ and $i_2$ runs through the route shown with a dotted line and are given pulse width control, the normal ripple voltage occurrs in DC load and the same performance as the conventional DC—DC converter is maintained.

As seen from the test results, the rate of DC output power and AC input power in the circuit of FIG. 8 is approx. 75%~80%, rather lower than the circuit of FIG. 7, though there is some difference depending on the output capacity or the performance of components used.

Nevertheless, power factor-efficiency are remarkably improved compared with the conventional switching regulator whose rate of DC output power and AC input power is 50%~65%. And the harmonics in low frequency zone (3rd to 19th) involved in input current is fully reduced and meets the IEC Standard.

Figure 11A:
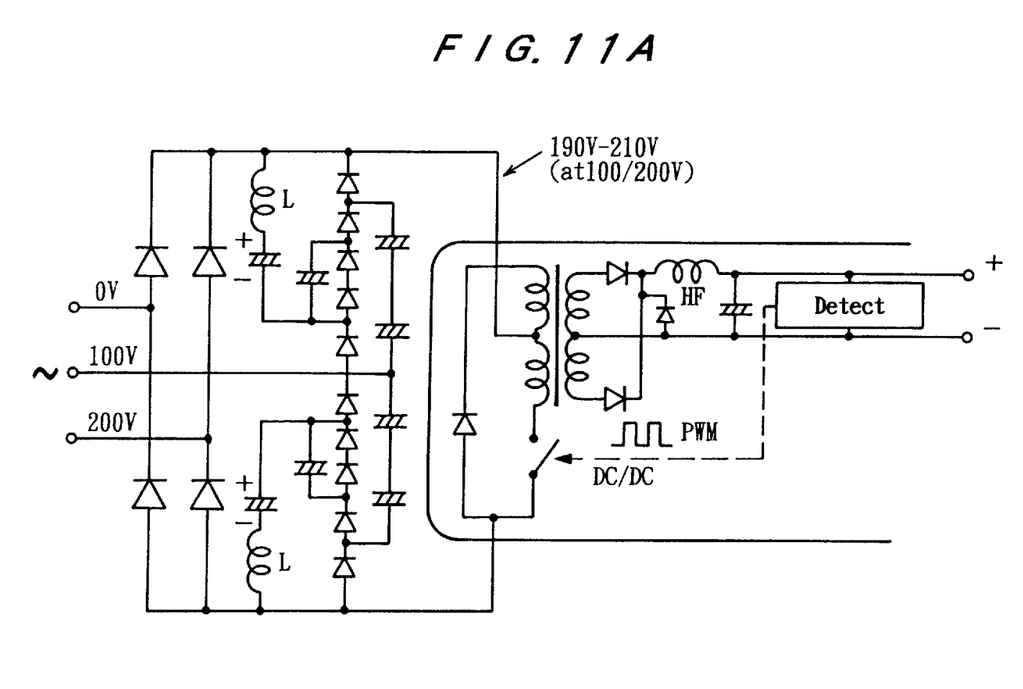
FIGS. 11A, 11B and 11C show actual examples of circuits according to FIG. 6, FIG. 7 and FIG. 9 when commonly used with 100/115V and 200/230V compatible.
Figure 11B:
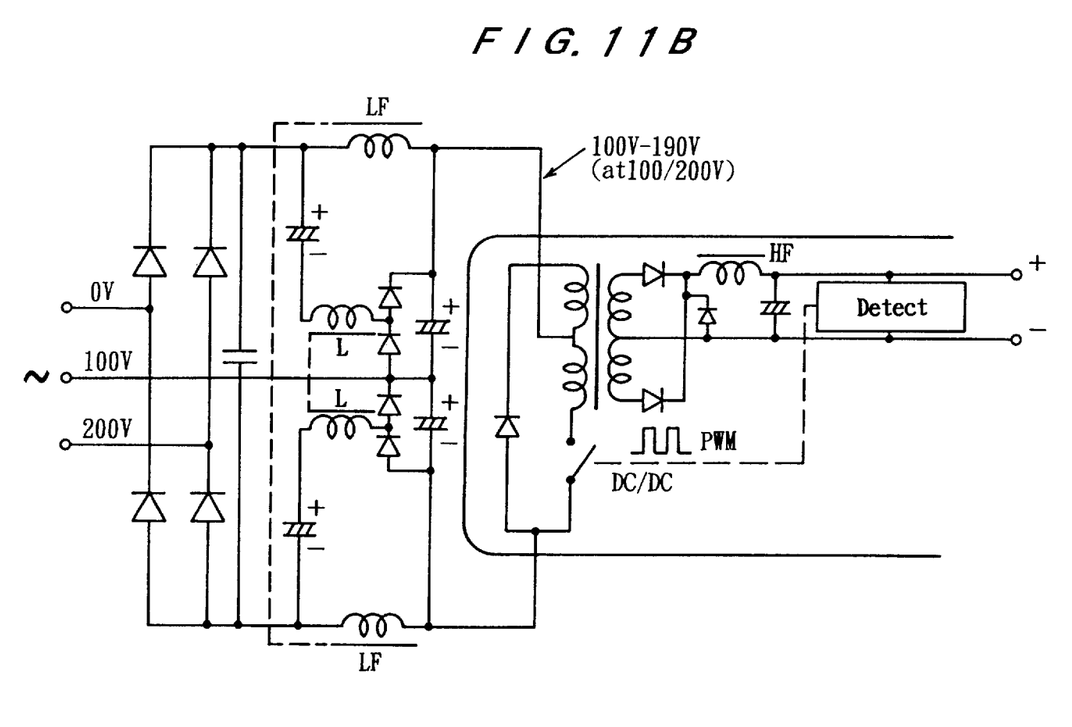
Figure 11C:
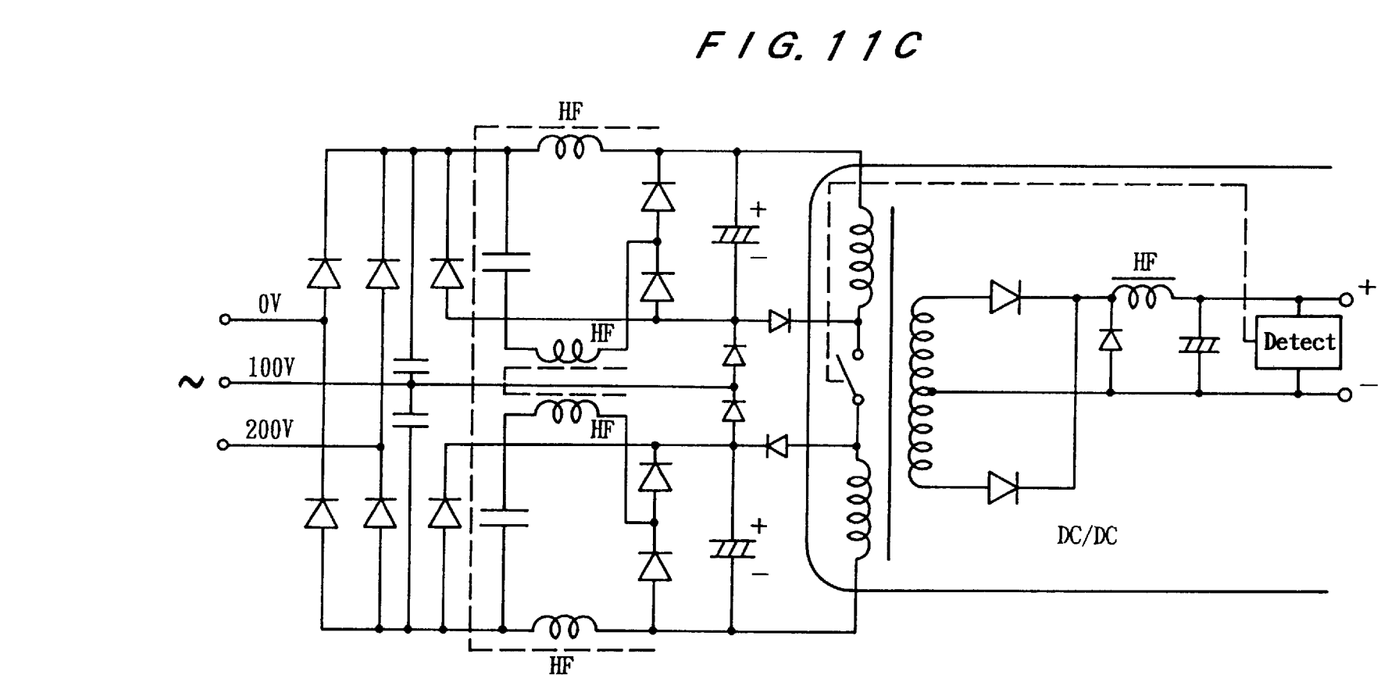

FIG. 10 shows an example of combination of a popular push-pull type DC—DC converter with two transistor type to obtain output power with large capacity and this invented hybrid rectification method. This means that various application is possible for this invented hybrid rectification method. FIG. 11 (A),(B) and (C) shows circuit configurations when the circuits of FIG. 6, FIG. 7 and FIG. 9 are commonly used with 100/115V and 200/230V compatible.

As precisely explained above, this invention is able to realize AC to DC conversion with little harmonic component, and able to save 10~15% of input power than the conventional method and keep more than 85% of power factor by using single phase input hybrid rectification method to add the rerectified DC component of the ripple power (AC component) to the fundamental wave DC component.

Further, it can decrease the harmonic components to AC input current.

It is also able to realize various single phase input hybrid rectifier circuits is little cost increase and with limitation free with respect to power capacity range.

We claim:

1. A single phase input hybrid rectification method comprising:

subjecting a single phase AC input voltage to a single-phase full-bridge rectifier to obtain a first rectified voltage having a fundamental DC component and a harmonic component, the harmonic component being defined by a ripple voltage of the first rectified voltage; and subjecting the first rectified voltage to an auxiliary rectification in which the ripple voltage of the first rectified voltage is rectified and a resultant auxiliary DC component is added to the fundamental DC component to obtain a DC component of a rectified output voltage.

2. A single phase input hybrid rectification method comprising:

subjecting a single phase AC input voltage to an LC filter type rectifier to obtain a first rectified voltage having a fundamental DC component and a harmonic component, the harmonic component being defined by a ripple voltage of the first rectified voltage; and subjecting the first rectified voltage to an auxiliary rectification in which the ripple voltage of the first rectified voltage is rectified and a resultant auxiliary DC component is added to the fundamental DC component to obtain a DC component of a rectified output voltage.

3. A single phase input hybrid rectification method comprising:

subjecting a single phase AC input voltage to a single-phase full-bridge rectifier to obtain a first rectified voltage having a fundamental DC component and a harmonic component, the harmonic component being defined by a ripple voltage of the first rectified voltage;

subjecting the first rectified voltage to an LC step-up filter composed of a step up secondary coil and a smoothing capacitor to obtain a filtered stepped-up ripple voltage at the secondary coil; and subjecting the filtered ripple voltage to an auxiliary rectification in which the filtered ripple voltage is rectified and a resultant auxiliary DC component is added to the fundamental DC component to obtain a DC component of a rectified output voltage.

4. A method as claimed in claim 2, further comprising controlling a semiconductor switch connected between a rectifier element and an LC filter such that an on/off frequency is higher than an input AC frequency to the semiconductor switch and such that a DC output voltage is controlled according to a duty ratio of the on/off control of the semiconductor switch.

* * * * *